US009853640B2

(12) United States Patent
Bell et al.

(10) Patent No.: US 9,853,640 B2
(45) Date of Patent: Dec. 26, 2017

(54) CONTINUOUSLY CHARGED ISOLATED SUPPLY NETWORK FOR SECURE LOGIC APPLICATIONS (71) Applicant: CHAOLOGIX, INC., Gainesville, FL (US)

(72) Inventors: Timothy Arthur Bell, Melbourne Beach, FL (US); Brent Arnold Myers, Palm Bay, FL (US)

(73) Assignee: Chaologix, Inc., Gainesville, FL (US)

( * ) Notice: Subject to any disclaimer, the term of this patent is extended or adjusted under 35 U.S.C. 154(b) by 81 days.

(21) Appl. No.: 14/793,258

(22) Filed: Jul. 7, 2015

(65) Prior Publication Data
US 2017/0063376 A1 Mar. 2, 2017

Related U.S. Application Data (60) Provisional application No. 62/021,788, filed on Jul. 8, 2014.

(51) Int. Cl.
*G05F 1/59* (2006.01)
*H03K 19/003* (2006.01)
*G09C 1/00* (2006.01)
*H04L 9/00* (2006.01)
*H03K 19/0948* (2006.01)

(52) U.S. Cl.
CPC ............ *H03K 19/003* (2013.01); *G05F 1/59* (2013.01); *G09C 1/00* (2013.01); *H03K 19/0948* (2013.01); *H04L 9/003* (2013.01); *H04L 9/004* (2013.01); *H04L 9/005* (2013.01); *H04L 2209/12* (2013.01)

(58) Field of Classification Search
CPC ............ G05F 1/461; G05F 1/585; G05F 1/59
See application file for complete search history.

(56) References Cited

U.S. PATENT DOCUMENTS

| 6,380,798 | B1 * | 4/2002 | Mizuno | .............. | H03K 19/0016 |
| | | | | | 327/391 |
| 6,643,208 | B2 * | 11/2003 | Yamagata | ................ | G11C 5/14 |
| | | | | | 365/226 |
| 6,833,748 | B2 * | 12/2004 | Cho | .................... | H03K 19/0016 |
| | | | | | 327/374 |

(Continued)

FOREIGN PATENT DOCUMENTS

| EP | 1688870 A1 | 8/2006 |
| JP | 2010/56730 A | 3/2010 |

OTHER PUBLICATIONS

International Search Report and Written Opinion, issued in International Patent Application No. PCT/US2015/039364, dated Oct. 13, 2015 (11 pages).

*Primary Examiner* — Jeffrey Zweizig
(74) *Attorney, Agent, or Firm* — Talem IP Law, LLP (57) ABSTRACT

A floating core network for secure isolation of a circuit from an external supply interface is described. Isolation of a core is accomplished through a dynamic current limiting network providing an isolated core voltage to the core; and an isolated supply for the corresponding core that is continuously recharged by the dynamic current limiting network. The dynamic current limiting network can include two control loops, one control loop providing a fixed gate voltage to a p-type transistor supplying current to the isolated supply and another control loop providing a fixed gate voltage to an n-type transistor sinking current from the isolated supply.

15 Claims, 7 Drawing Sheets

(56) References Cited

U.S. PATENT DOCUMENTS

| | | | | |
|---|---|---|---|---|
| 7,436,206 B2* | 10/2008 | Kurotsu | ............... | G11C 11/417 326/31 |
| 7,839,205 B2* | 11/2010 | Hirobe | ..................... | G05F 1/56 327/534 |
| 8,120,410 B2* | 2/2012 | Meijer | ................. | G06F 1/3203 327/534 |
| 8,421,525 B2* | 4/2013 | Kawasaki | ................ | G05F 1/56 327/540 |
| 9,007,122 B2* | 4/2015 | Lundberg | ............. | G06F 1/3234 327/365 |
| 2006/0176033 A1 | 8/2006 | Malherbe et al. | | |
| 2007/0076890 A1 | 4/2007 | Muresan et al. | | |
| 2014/0167837 A1 | 6/2014 | Yannette et al. | | |

* cited by examiner

CONTINUOUSLY CHARGED ISOLATED SUPPLY NETWORK FOR SECURE LOGIC APPLICATIONS

CROSS REFERENCE TO RELATED APPLICATION(S)

This application claims the benefit of U.S. Provisional Application Ser. No. 62/021,788, filed Jul. 8, 2014.

BACKGROUND

Secure systems, including encryption systems, are vulnerable to cryptographic attacks. Secret, cryptographic "keys" used to communicate information between intra-system components (and even extra-system components) and various other circuit operations can be determined by monitoring the power supply currents of the system as well as by way of complex mathematic means to deduce the secure information attributes. To prevent secure information from leaking to the integrated circuit power supply, it is necessary to isolate the secure logic in a way that prevents or greatly attenuates measurable indications of the energy required to operate the secure network.

The energy required to operate the secure network is typically in the form of current impulses that charge or discharge node capacitance present at a logic gate output. Logic gates simply determine whether a node is pulled high (to the positive supply rail) or low (to the negative supply rail) dependent on the inputs to the logic gate. If a node is pulled high, then an impulse current from the positive supply is provided to charge the capacitance at that node to a high value. If a node is pulled low, then the charge present on the capacitor is discharged to the negative supply and is visible as a current impulse. These current impulses may be used by attackers to deduce secure information.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A floating core network for secure isolation of a circuit from an external supply interface is described. Isolation of a core is accomplished through a dynamic current limiting network providing an isolated core voltage to the core; and an isolated supply for the corresponding core that is continuously recharged by the dynamic current limiting network. Although the core may be directly connected to an external supply at DC, the core can be effectively isolated from the external power supply with respect to its susceptibility to side channel attacks.

BRIEF DESCRIPTION OF THE DRAWINGS

FIGS. 3A-3C illustrate the transient current through a representative secure logic cell.

DETAILED DISCLOSURE

A floating core network for secure isolation of a circuit from an external supply interface is described. The floating core network requires no special charge control or clocking networks. Instead, a control network provides AC (alternating) or pulsating isolation for the core, while for the DC (direct) component, the core is directly connected to the external supply. The information signal is greatly attenuated by the ratio of the information bandwidth to the control loop bandwidth.

Through the described continuously charged isolated supply network, a core of logic cells and other circuit blocks can be secured for a variety of applications including cryptographic applications involving "crypto" or "cryptographic" blocks such as encryption blocks, authentication engines, hardware math accelerators, and coprocessors.

Various implementations can reduce current components containing secure information, reduce or obscure circuit operational related information derivable from device current leakage, improve side channel immunity, and minimize power consumption.

Certain implementations may also be used to protect secure information from being detected through side channel analysis attacks. Side channel attacks involve methods of attack that derive sensitive information based on the physical implementation of the crypto system as opposed to deriving the sensitive information through mathematical analysis of the crypto algorithms or brute force. Various types of side channel attacks that may be inhibited by the systems and methods described herein include, but are not limited to, at least one of differential power analysis, simple power analysis, leakage current analysis, differential electromagnetic field analysis, timing analysis, heat, acoustic analysis, fault injection and differential fault analysis.

Crypto-blocks in hardware such as smart cards, near field communication (NFC) controllers (and other wireless communication controllers and processors), field programmable gate arrays (FPGAs), and application specific integrated circuits (ASICs) are generally composed of logic blocks that carry out an encryption or other cryptographic algorithm.

Within cryptographic blocks implemented with standard logic circuits, the transition of logic states within these circuits create currents that can be detectable upon the power supply (and ground) lines powering the cryptographic block. In addition, the transition of a logic block from a low to a high logic state has a different power signature than a high to low transition. As a result, by monitoring the supply lines powering the cryptographic block, operations within the cryptographic block can be decoded. This approach is referred to as differential power analysis (DPA). Similarly, electromagnetic leaks during logic transitions may be monitored to decode operations within the cryptographic block. Using such side channel attacks, encryption keys used by an encrypted block can be deciphered, resulting in a breach in security of data processed by the encryption block.

Embodiments of the invention can provide minimal area overhead while protecting logic blocks from revealing logic state transitions. Furthermore, not only do embodiments isolate operations of the core so that power consumption is inhibited from being sensed from a supply line during operations of the core, but systems and methods of the invention also protect from charge being read from ground lines. I/O busses and other signal lines can also be protected from side channel attack probes by inhibiting decipherable transition signatures on the signal lines.

Figure 1A:
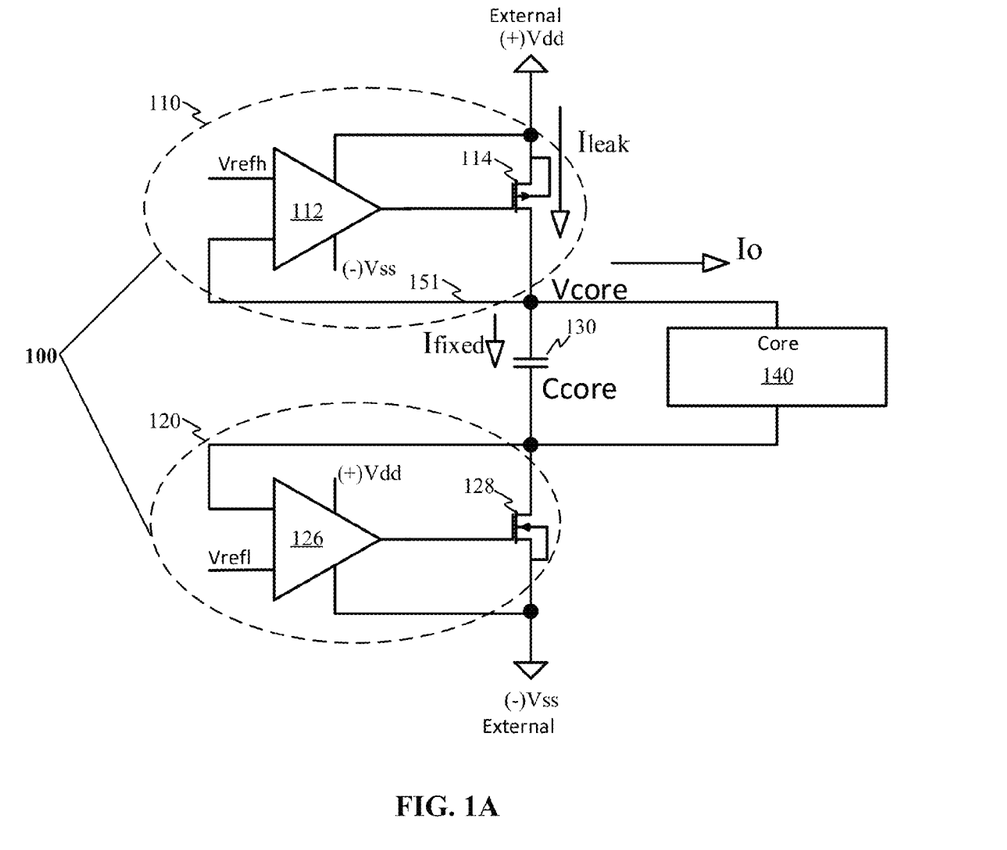
FIG. 1A shows a high level schematic diagram of a continuously charged isolated supply system.

FIG. 1A shows a high level schematic diagram of a continuously charged isolated supply system. A dynamic current limiting network, control network 100, for a continuously charged isolated supply system includes two control loops, upper control loop 110 and lower control loop 120. Upper control loop 110 includes an upper two-input amplifier 112 and a p-channel transistor 114. The p-channel transistor 114 can be a p-type insulated-gate field effect transistor (e.g., IGFET or MOSFET) (also referred to as a PMOS transistor) or any other suitable transistor. Lower control loop 120 includes a lower two-input amplifier 126 and an n-channel transistor 128. The n-channel transistor 128 can be an n-type IGFET or MOSFET (also referred to as an NMOS transistor) or any other suitable transistor.

The two control loops 110 and 120 continuously recharge an isolated supply. Here, the isolated supply is represented by capacitor Ccore 130, which can be any suitable charge storage device such as a capacitor and may even include or be fully implemented by internal capacitance of the core itself (thereby representing the capacitance of the core 140). Indeed, the capacitor 130 may be implemented by a charge storage device formed of a discrete capacitor, a metal-insulator-metal capacitor, a metal-oxide-semiconductor capacitor, parasitic capacitance of the core, a combination thereof, or a multiplicity of any one or more thereof.

The continuously charged isolated supply system of the dynamic current limiting network 100 and the capacitor 130 provide an isolated core voltage (Vcore) to a core 140. The core 140 can include a set of logic gates configured in any desired manner. Core 140 can include one or more full circuits and/or subsets of circuits in the form of one or more cells (e.g., multiple circuit(s) or cells 140A and 140B; or one circuit, group of cells, or cell 140C as shown in FIG. 1B).

Figure 1B:
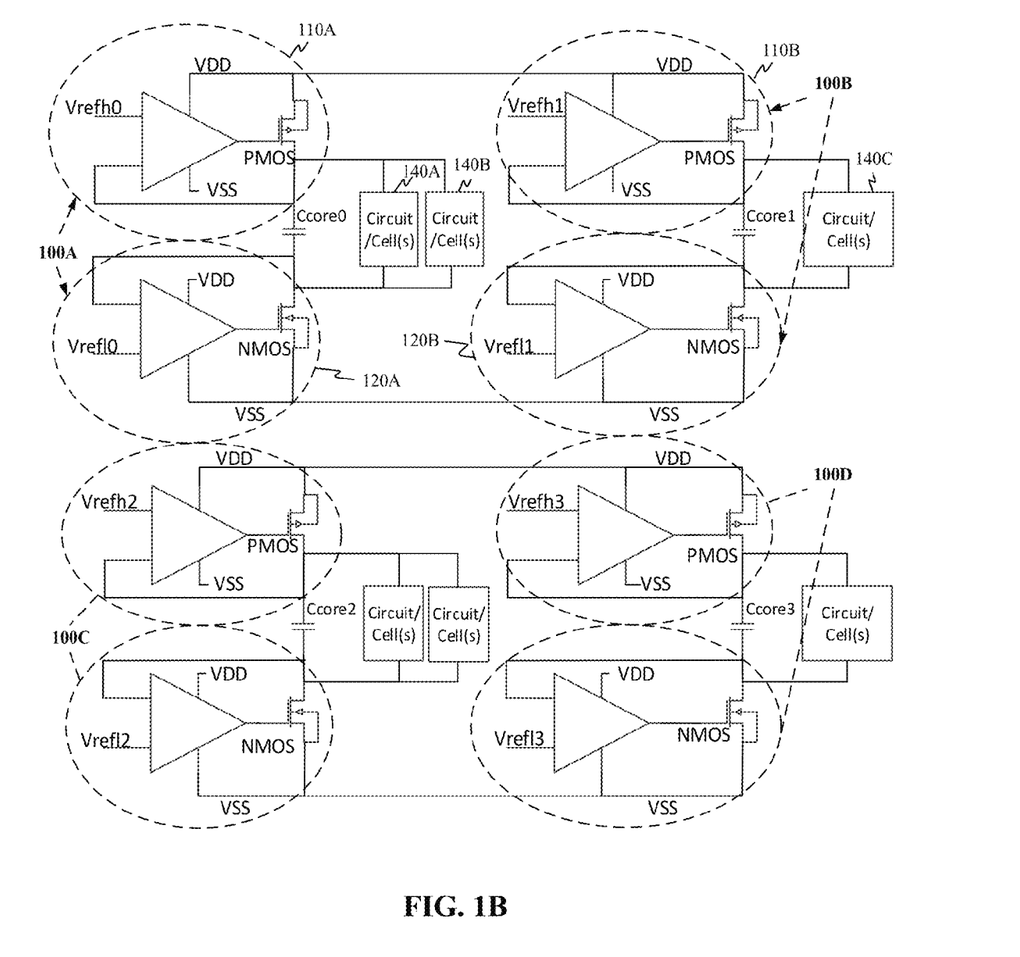
FIG. 1B shows a network of continuously charged isolated supply systems.

There may be several control networks 100 that provide isolated core voltages (Vcore) in a given integrated realization, such as shown in FIG. 1B. FIG. 1B shows a network of continuously charged isolated supply systems. As shown in FIG. 1B, the control networks 100A, 100B, 100C, 100D (and so on) and corresponding capacitors Ccore0, Ccore1, Ccore2, Ccore3 (and so on) may be distributed throughout the integrated logic to power corresponding "cores" of one or more circuits and/or cells 140A, 140B, 140C (and so on). Multiple control loops can be arranged to provide energy for those logic gates connected to the individual control loops (individual loop domains). For example, control network 100A includes a first upper control loop 110A and a first lower control loop 120A providing energy to connected circuit or cell(s) 140A and 140B; and control network 100B includes a second upper control loop 110B and a second lower control loop 120B providing energy to connected circuit or cell(s) 140C. Signals may be passed between domains, but each domain is locally supplied.

Returning to FIG. 1A, capacitor 130 provides the transient current impulses necessary to charge and discharge node currents within a logic cell block of the core 140. The capacitor 130 provides a logic supply that is isolated from both positive and negative rails (e.g., external Vdd and external Vss) by virtue of the two separate control loops 110, 120. The control network 100 (of the two control loops) assures that the capacitor 130 is continuously recharged to replenish charge lost due to logic operations of the logic cell(s) in the core 140. Transistor 114 (which may be a PMOS transistor) and transistor 128 (which may be an NMOS transistor) provide the means by which the capacitor 130 is continuously charged (to generate the core voltage Vcore). The feedback loop 151 to the upper two-input amplifier 112 of the upper controller 110 assures that Vcore reaches a steady state value equal to the input voltage reference (Vrefh).

In many implementations, the logical current impulses occur in such a short time that, from an AC point of view, most of the transient current (Io) is provided by capacitor 130 (Ccore), and any current provided via the supply (Vdd) (i.e., Ileak) is so small that it is virtually unobservable. "Fixed" current (Ifixed) assures that a quiescent current always flows to assure stability of the control loop 110.

As mentioned above, Io represents the impulse current sources, provided by Ccore 130 that occur during logic operations. Current through transistor 114 (providing equivalent resistance Req) then replenishes the charge lost in supporting the transient current, but at a rate and amplitude much less than the original current impulse Io. The rate is dictated by the bandwidth of the control loop which is defined by the product Req×Ccore. Ileak is the residual current present at the power supply terminal that occurs during a transient impulse (Io).

Figure 2:
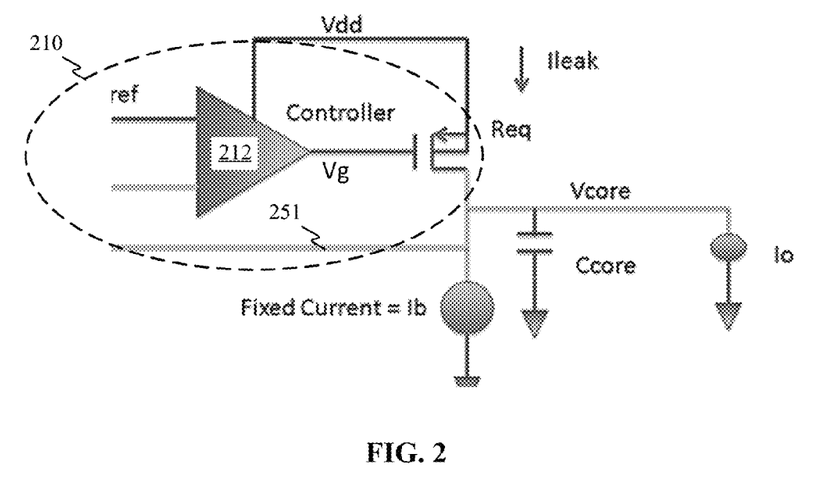
FIG. 2 shows a single ended equivalent circuit of a continuously charged secure system.
Figures 3A, 3B:
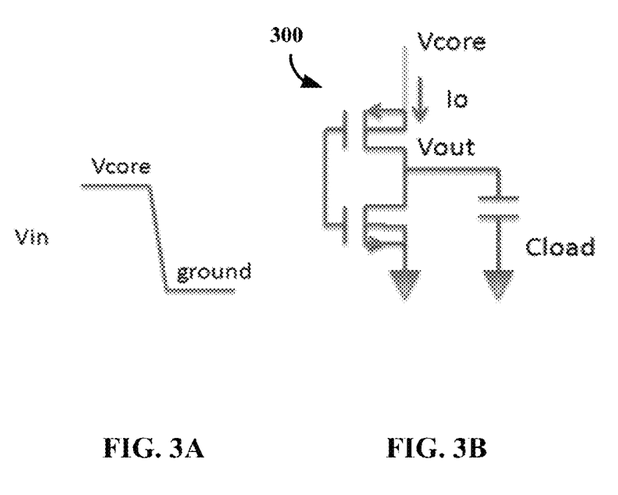
FIG. 3A illustrates an input signal.
FIG. 3B illustrates a single NOT gate.
Figure 3C:
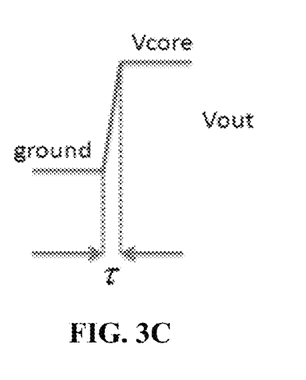
FIG. 3C illustrates the output signal.

It is possible to quantify the attenuation of information impulses. The single ended equivalent circuit of the network 100 is shown in FIG. 2. Referring to FIG. 2, a controller (e.g., two-input amplifier 212 of an upper control loop control network 210) provides a gate voltage Vg to a p-channel transistor 214, which in turn has an equivalent resistance to the supply of value Req. The feedback loop 251 to the controller assures that the core voltage (Vcore) reaches a steady state value equal to the input voltage reference Vref. The fixed current Ifixed of FIG. 1A is shown as Ib in the single ended equivalent circuit network. As mentioned above with respect to FIG. 1A, it is possible to quantify the information leakage by determining the signal energy present at the supply due to a transient current Io. The transient current Io may be determined by considering a core having a single gate, an inverter 300, as shown in FIG. 3B. Here, with an input Vin that switches from Vcore to ground as illustrated in FIG. 3A, it is assumed the inverter 300 changes state (e.g., from ground to Vcore) within a gate delay of τ seconds as illustrated in FIG. 3C. Since the inverter 300 switches between ground and Vcore, the current Io (as shown in FIG. 3B) can be as given in Equation 1:

$$I_O = C_{load} \frac{v_{core}}{\tau} = C_{load} \frac{v_{ref}}{\tau}. \tag{1}$$

Here, it is assumed that Vcore is equal to Vref, as forced by the control loop 210. Note that Io may be scaled by the number of gates within a logic block.

Analysis of FIG. 2 yields the leakage current visible at the supply terminals when a capacitive load is switched from ground to Vdd (Vref), as given in Equation 2:

$$I_{leak} = C_{load} \frac{1}{Req \times Ccore} Vref \times e^{-t/Req \times Ccore}. \tag{2}$$

The leakage energy $E_f$ is then given by Equation 3:

$$E_f = \int_0^\infty I_{leak}^2(t)dt \qquad (3)$$

$$= \left(V_{ref}\frac{C_{load}}{Req \times Ccore}\right)^2 \int_0^\infty \frac{2t}{e^{Req \times Ccore}}dt$$

$$= \frac{(C_{load} \times V_{ref})^2}{2Req \times Ccore}$$

$$= \pi f_{loop}(C_{load} \times V_{ref})^2.$$

where $$f_{loop} = \frac{1}{2\pi\, Req \times Ccore}$$

is the loop bandwidth of the control network.

The initial information leakage $E_i$, can be determined easily from Equation 1 and is given as Equation 4:

$$E_i = \frac{(C_{load} \times V_{ref})^2}{\tau}. \qquad (4)$$

A pulse of width $\tau$ has an equivalent bandwidth given by $f_{eq}=1/(\tau\pi)$. Using this relationship in Equation 4, the ratio of output energy (Equation 3) to input energy (Equation 4) yields the amount of leakage gain given by Equation 5:

$$G = \frac{E_f}{E_i} = \frac{f_{loop}}{f_{eq}}. \qquad (5)$$

If the loop bandwidth is made smaller than the current impulse bandwidth, then the leakage gain G can be made arbitrarily small. This can be accomplished due to the extremely small gate delays typical of modern day technology. Also, it should be noted that this result is independent of operating frequency and dependent only on the transition time of the logic gates. The loop bandwidth of the control network, floop, is controlled by Req and Ccore which therefore become design variables for any particular application.

Figure 4:
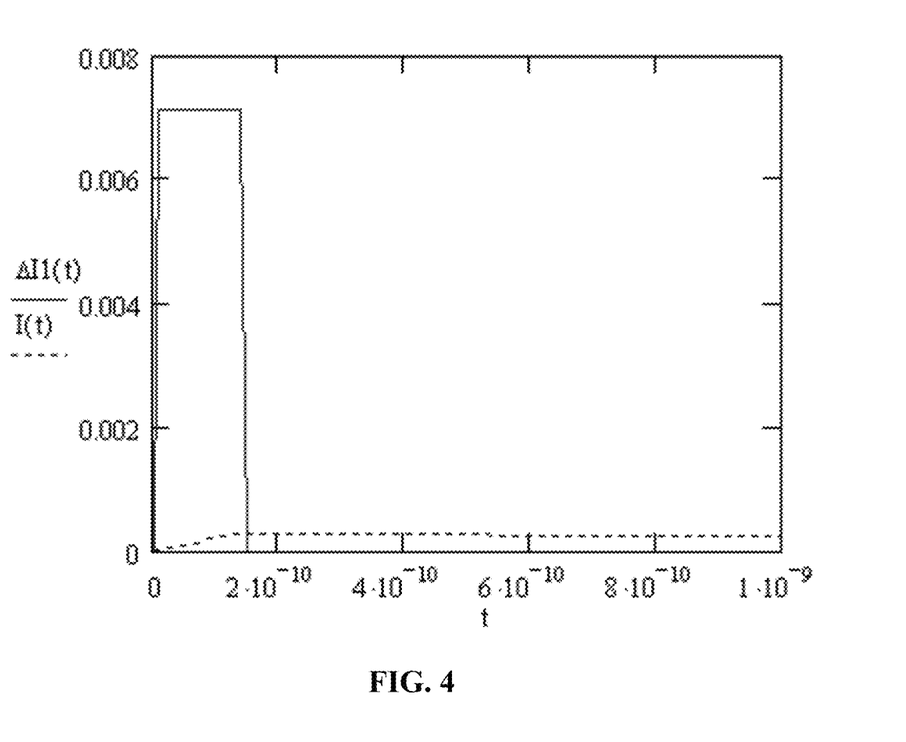
FIG. 4 shows expected peak leakage with current pulse.

FIG. 4 shows expected peak leakage with current pulse. In the plot of FIG. 4, the response of the system to a current impulse of duration 140 ps with process parameters for a typical 65 nm logic gate is shown. Here leakage attenuation of a factor of 50 is obtained when the core capacitance is about 3 times the gate load capacitance. Greater attenuation is possible by increasing the core capacitance. Note that the impulse is greatly reduced in amplitude and spread in time which makes detection difficult.

Figure 5:
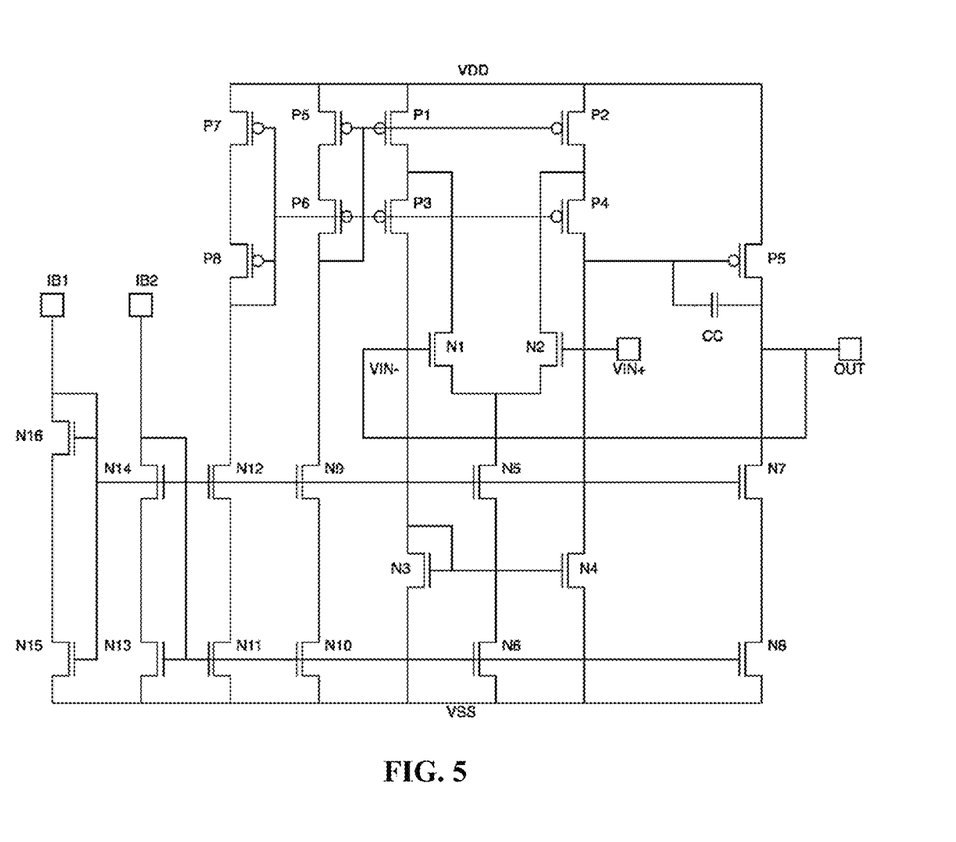
FIG. 5 shows a schematic diagram of an example control loop and output device for the positive rail in the system of FIG. 1.

FIG. 5 shows a schematic diagram of an example control loop and output device (e.g., transistor 114) for the positive rail in the system of FIG. 1A. The schematic diagram of FIG. 5 illustrates a CMOS device level implementation of the upper control loop 110 shown in FIG. 1A inclusive of the two-input amplifier 112 and the output device of transistor 114 which is implemented here as PMOS transistor P5. Devices N1 and N2 form a differential pair which drives the cascode arrangement formed by P1, P2, P3, and P4. Devices N3 and N4 form an active load that drives the gate of the output device P5. Capacitor CC and the transconductance of the differential pair provide a compensation network which assures stability of the entire system.

The remaining devices in this implementation provide various bias currents and voltages to assure wide operating range. Vref is applied to VIN+ to force the output of the loop to this value. Devices N7 and N8 provide a bias current to assure stability of the amplifier under minimal load conditions. Although not shown, the complementary amplifier (lower amplifier 114 in FIG. 1A) can be identical in design to that of FIG. 5, but with device and supply polarities reversed as familiar to those skilled in the art. For example, the input differential pair can be composed of p-channel devices with the active load connected to VSS via n-channel devices.

Figure 6:
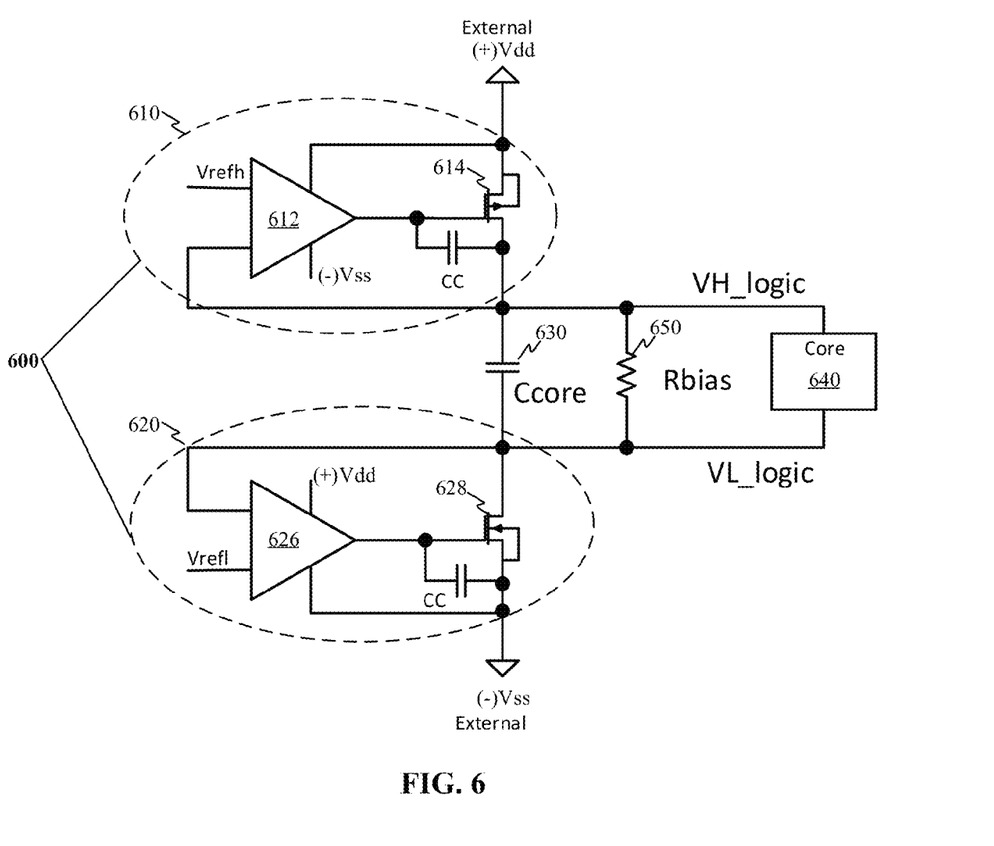
FIG. 6 shows a high level schematic diagram of a continuously charged isolated supply system with efficient bias.
Figure 7:
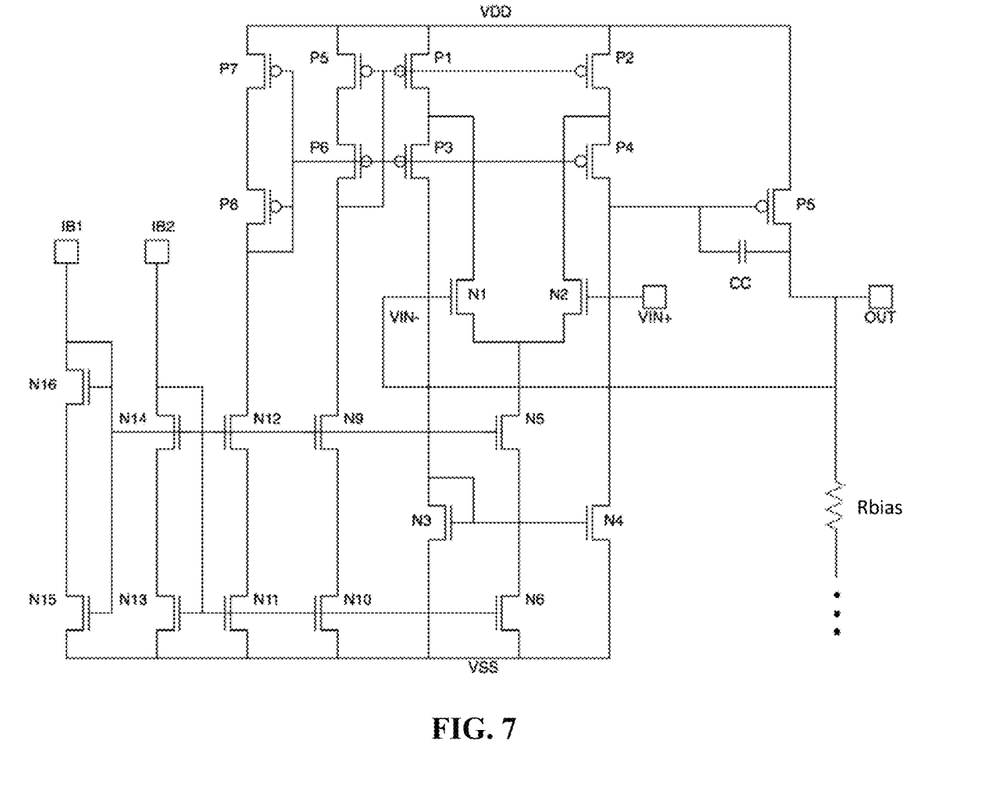
FIG. 7 shows a schematic diagram of an example control loop and output device for the positive rail in the system of FIG. 6.

An alternative design is illustrated in FIG. 6, which shows a high level schematic diagram of a continuously charged isolated supply system with efficient bias. Referring to FIG. 6, the continuously charged isolated supply system for a core 640 can include a control network 600 with upper control loop 610 having upper two-input amplifier 612 and p-channel device 614; and lower control loop 620 having lower two-input amplifier 626 and n-channel device 628, such as described with respect to FIG. 1A. In addition, the two control loops 610 and 620 continuously recharge an isolated supply represented by capacitor (Ccore) 630. However, unlike the implementation of FIG. 1A, the design shown in FIG. 6 includes a resistor Rbias 650 between the isolated positive and negative rails (at the outputs of the control loops 610 and 620). In addition, coupling capacitors CC can be included for the transistors 614 and 628. These capacitors may also be included in the implementation shown in FIG. 1A. FIG. 7 shows a schematic diagram of an example control loop and output device for the positive rail in the system of FIG. 6. In this case, the PMOS device for p-channel device 614 is the same device as P5 in FIG. 5 (and other similar devices are labelled accordingly). As shown in FIG. 7, the drain of the PMOS device P5 is now connected to the complementary NMOS device (not shown in FIG. 7) through Rbias, thus eliminating the need for the bias current devices N7 and N8 in FIG. 5 (and the corresponding complementary bias devices for the lower amplifier).

Based on the average switching current of the driven logic block, the size of PMOS, NMOS, and Ccore must be properly set to assure adequate core charging. At times when the logic block is static the quiescent current (IQ) must also be maintained in the output devices (PMOS, NMOS) to maintain loop stability. Further, the value of IQ must increase as Ccore increases to maintain stability.

An efficient method for setting IQ is to place a resistor (Rbias) between the output drain nodes (as shown in FIG. 6). IQ is then equal to (VH_logic−VL_logic)/Rbias. With this method the two-input amplifier design (for two-input amplifiers 612 and 626) remains fixed and only the output stage components are scaled based on the size and speed of the driven logic block. This results in a simpler physical implementation removing the need to vary bias current in the output stage as Ccore varies, as would be the case in FIG. 5.

A loop bandwidth (the operation speed of the control loop) may be selected to meet (information) leakage requirements during design. The absolute values of Req and Ccore can also be chosen based on operating speed. For example, as the operating speed is increased, the value of Req may be decreased to achieve adequate charging of the core and the value of Ccore may be increased to maintain the loop bandwidth.

The described technology requires no charge controlling signals and relies purely on slow loop performance (bandwidth) to allow a continuous replenishing of core charge without complex redistribution signals.

The described control network is suitable for any core logic or circuitry at effectively any operating frequency so long as Req and/or Ccore are selected appropriately. Various implementations are suitable for high frequency circuits (e.g., core logic), including those operating at radio frequency or at or above 500 MHz (e.g., microwave frequencies or possibly higher). Various implementations are also suitable for lower frequency circuits including those operating on the order of 10 MHz or even lower.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

We claim:

1. A secure system comprising:
a dynamic current limiting network providing an isolated core voltage to a corresponding core; and
an isolated supply for the corresponding core that is continuously recharged by the dynamic current limiting network, the isolated supply having an upper rail and a lower rail coupled to the dynamic current limiting network and the isolated supply being isolated from an external supply interface.

2. The secure system of claim 1, wherein the dynamic current limiting network and isolated supply are provided in plurality and distributed to supply power throughout an integrated circuit forming a plurality of the corresponding cores.

3. The secure system of claim 1, wherein the dynamic current limiting network comprises a first control loop and a p-channel transistor for the upper rail, the first control loop supplying a gate voltage to the p-channel transistor, the p-channel transistor connected as a common source amplifier with its output fed back to an input of the first control loop and providing an upper rail voltage to the corresponding core; and
a second control loop and an n-channel transistor for the lower rail, the second control loop supplying a gate voltage to the n-channel transistor, the n-channel transistor connected as a common source amplifier with its output fed back to an input of the second control loop and providing a lower rail voltage to the corresponding core.

4. The secure system of claim 3, wherein the first control loop comprises a first two-input amplifier, one of the two inputs of the first two-input amplifier receiving an upper reference voltage, and wherein the p-channel transistor is connected as the common source amplifier with its output fed back to the other one of the two inputs of the first two-input amplifier; and
wherein the second control loop comprises a second two-input amplifier, one of the two inputs of the second two-input amplifier receiving a lower reference voltage, and wherein the n-channel transistor is connected as the common source amplifier with its output fed back to the other of the two-inputs of the second two-input amplifier.

5. The secure system of claim 3, wherein the isolated supply comprises a charge storage device, wherein the common source amplifier output of the p-channel transistor is connected at one node of the charge storage device, wherein the common source amplifier output of the n-channel transistor is connected at the other node of the charge storage device.

6. The secure system of claim 5, further comprising a bias resistance in parallel with the charge storage device, the bias resistance having a value for biasing the first two-input amplifier and the second two-input amplifier.

7. The secure system of claim 1, wherein an operating frequency of the corresponding core is equal to or greater than 500 MHz.

8. The secure system of claim 1, wherein an operating frequency of the corresponding core is about 10 MHz to tens of MHz.

9. The secure system of claim 1, wherein the isolated supply is a charge storage device.

10. The secure system of claim 9, wherein the charge storage device is at least one of a discrete capacitor, a metal-insulator-metal capacitor, a metal-oxide-semiconductor capacitor, and parasitic capacitance of the core.

11. A method of protecting against at least one side channel attack from the group consisting of differential power analysis, simple power analysis, leakage current analysis, differential electromagnetic field analysis, timing analysis, heat, acoustic analysis, fault injection and differential fault analysis, the method comprising:
providing a secure system comprising a dynamic current limiting network and an isolated supply for a corresponding core, the isolated supply having an upper rail and a lower rail coupled to the dynamic current limiting network and the isolated supply being isolated from an external supply interface; and
operating the dynamic current limiting network to continuously recharge the isolated supply and provide an isolated core voltage for the corresponding core.

12. The method of claim 11, wherein the dynamic current limiting network and the isolated supply are provided in plurality and distributed to supply power throughout an integrated circuit forming a plurality of the corresponding cores, the method further comprising:
operating the plurality of dynamic current limiting networks to continuously recharge the plurality of isolated supplies and provide corresponding isolated core voltages for the plurality of the corresponding cores.

13. The method of claim 11, wherein the dynamic current limiting network comprises a first control loop and a p-channel transistor connected as a common source amplifier with its output fed back to an input of the first control loop; and
a second control loop and an n-channel transistor connected as a common source amplifier with its output fed back to an input of the second control loop,
wherein operating the dynamic current limiting network to continuously recharge the isolated supply and provide the isolated core voltage for the corresponding core comprises:
supplying an external upper rail voltage to a source of the p-channel transistor;
supplying an external lower rail voltage to a source of the n-channel transistor;

supplying an upper reference voltage to another input of the first control loop;

supplying a lower reference voltage to another input of the second control loop;

supplying a first gate voltage to the p-channel transistor using the first control loop, and providing an upper rail voltage to the corresponding core at an output of the p-channel transistor via the upper rail; and supplying a second gate voltage to the n-channel transistor using the second control loop, and providing a lower rail voltage to the corresponding core at an output of the n-channel transistor via the lower rail.

14. The method of claim 13, further comprising operating the corresponding core using the isolated core voltage.

15. The method of claim 13, further comprising:

setting a size of the p-channel transistor, the n-channel transistor, and a capacitance of the isolated supply based on an average switching current of the corresponding core.

* * * * *